US010455265B2

(12) United States Patent
Biagini et al.

(10) Patent No.: US 10,455,265 B2
(45) Date of Patent: Oct. 22, 2019

(54) PROGRAM AND DEVICE CLASS ENTITLEMENTS IN A MEDIA PLATFORM

(71) Applicant: Ericsson AB, Stockholm (SE)

(72) Inventors: Daniel Biagini, Bolton, MA (US); Mikhail Mikhailov, Newton, MA (US); Kevin Ma, Nashua, NH (US); Prabhudev Navali, Westford, MA (US); Robert Arritt, Nashua, NH (US)

(73) Assignee: Ericsson AB, Stockholm (SE)

( * ) Notice: Subject to any disclaimer, the term of this patent is extended or adjusted under 35 U.S.C. 154(b) by 0 days.

(21) Appl. No.: 14/829,196

(22) Filed: Aug. 18, 2015

(65) Prior Publication Data

US 2016/0316244 A1 Oct. 27, 2016

Related U.S. Application Data

(60) Provisional application No. 62/153,036, filed on Apr. 27, 2015.

(51) Int. Cl.

| | |
|---|---|
| ***H04N 21/266*** | (2011.01) |
| ***H04H 60/14*** | (2008.01) |
| ***H04N 21/2662*** | (2011.01) |
| ***H04N 21/2347*** | (2011.01) |
| ***H04N 21/254*** | (2011.01) |

(Continued)

(52) U.S. Cl.

CPC ........ *H04N 21/2662* (2013.01); *H04H 60/14* (2013.01); *H04H 60/23* (2013.01); *H04N 21/2187* (2013.01); *H04N 21/2347* (2013.01); *H04N 21/23439* (2013.01); *H04N 21/2541* (2013.01); *H04N 21/25816* (2013.01); *H04N 21/25875* (2013.01); *H04N 21/26258* (2013.01); *H04N 21/26606* (2013.01); *H04N 21/4508* (2013.01); *H04N 21/4627* (2013.01); *H04N 21/64753* (2013.01); *H04N 21/6543* (2013.01); *H04N 21/835* (2013.01);

(Continued)

(58) Field of Classification Search

CPC .................................................... H04N 21/266

See application file for complete search history.

(56) References Cited

U.S. PATENT DOCUMENTS

| | | | |
|---|---|---|---|
| 6,735,313 B1 * | 5/2004 | Bleichenbacher | H04H 60/23 348/E7.056 |
| 7,233,948 B1 * | 6/2007 | Shamoon | H04N 21/234318 |

(Continued)

FOREIGN PATENT DOCUMENTS

| | | |
|---|---|---|
| WO | WO 2014/090761 A1 | 6/2014 |
| WO | WO 2015/013411 A1 | 1/2015 |

OTHER PUBLICATIONS

Hartung, et al.: "DRM Protected Dynmaic Adaptive HTTP Streaming". MMSys'11. Feb. 23-25, 2011. San Jose, California.

(Continued)

*Primary Examiner* — Michael H Hong

(74) *Attorney, Agent, or Firm* — The Danamraj Law Group, P.C.

(57) ABSTRACT

A method and apparatus for managing entitlements in a broadcast stream are disclosed. The method includes receiving a manifest containing program information for a program in the broadcast stream, with the program information providing a program entitlement block. The method uses entitlements specified in the program entitlement block to enforce entitlements for the program.

13 Claims, 13 Drawing Sheets

(51) Int. Cl.

| | |
|---|---|
| ***H04N 21/258*** | (2011.01) |
| ***H04N 21/835*** | (2011.01) |
| ***H04N 21/2187*** | (2011.01) |
| ***H04N 21/2343*** | (2011.01) |
| ***H04N 21/262*** | (2011.01) |
| ***H04N 21/45*** | (2011.01) |
| ***H04N 21/4627*** | (2011.01) |
| ***H04N 21/647*** | (2011.01) |
| ***H04N 21/6543*** | (2011.01) |
| ***H04N 21/8352*** | (2011.01) |
| ***H04N 21/8355*** | (2011.01) |
| ***H04N 21/845*** | (2011.01) |
| ***H04H 60/23*** | (2008.01) |

(52) U.S. Cl.
CPC ..... *H04N 21/8352* (2013.01); *H04N 21/8355* (2013.01); *H04N 21/8456* (2013.01)

(56) References Cited

U.S. PATENT DOCUMENTS

| | | | | |
|---|---|---|---|---|
| 2002/0186844 | A1 | 12/2002 | Levy et al. | |
| 2007/0204290 | A1* | 8/2007 | Li | H04H 60/15 725/31 |
| 2010/0273553 | A1 | 10/2010 | Zalewski | |
| 2011/0258656 | A1 | 10/2011 | Michel | |
| 2012/0023251 | A1 | 1/2012 | Pyle et al. | |
| 2012/0066386 | A1 | 3/2012 | McGowan et al. | |
| 2013/0097706 | A1 | 4/2013 | Titonis et al. | |
| 2013/0121489 | A1 | 5/2013 | Pestoni et al. | |
| 2013/0159546 | A1 | 6/2013 | Thang et al. | |
| 2013/0212650 | A1 | 8/2013 | Dabbiere et al. | |
| 2013/0312046 | A1 | 11/2013 | Robertson et al. | |
| 2014/0109232 | A1 | 4/2014 | Kang et al. | |
| 2014/0196079 | A1 | 7/2014 | Jannard et al. | |
| 2014/0376623 | A1* | 12/2014 | Good | H04N 19/46 375/240.07 |
| 2015/0033023 | A1 | 1/2015 | Xu et al. | |
| 2015/0271541 | A1* | 9/2015 | Gonder | H04N 21/278 725/134 |
| 2015/0310188 | A1* | 10/2015 | Ford | G06F 21/10 726/28 |
| 2016/0164841 | A1* | 6/2016 | Mikhailov | H04N 21/2541 726/12 |
| 2016/0292398 | A1 | 10/2016 | Makam et al. | |

OTHER PUBLICATIONS

"Descriptions of Core Experiments on DASH Amendment". MPEG Meeting; Feb. 6-20, 2015. Geneva.
"Guidelines for Implementation: DASH-IF Interoperability Points". 3GPP Draft; DASH-IF-IOP-V2.90. Jan. 28, 2015.
USPTO, Office Action, U.S. Appl. No. 14/829,142, dated Oct. 6, 2016, 18 pgs.
USPTO, Office Action, U.S. Appl. No. 14/829,142, dated Apr. 12, 2017, 18 pgs.
USPTO, Office Action, U.S. Appl. No. 14/829,142, dated Oct. 18, 2017, 23 pgs.
USPTO, Office Action, U.S. Appl. No. 14/829,142, dated Apr. 4, 2018, 25 pgs.
USPTO, Office Action, U.S. Appl. No. 14/829,142, dated Sep. 6, 2018, 24 pgs.
USPTO, Office Action, U.S. Appl. No. 14/829,142, dated Jan. 14, 2019, 24 pgs.
USPTO, Advisory Action, U.S. Appl. No. 14/829,142, date Apr. 1, 2019, 4 pgs.
International Bureau, International Preliminary Report on Patentability, Application No. PCT/IB2016/052310, Oct. 31, 2017, 10 pgs.
International Bureau, International Preliminary Report on Patentability, Application No. PCT/IB2016/052316, Oct. 31, 2017, 10 pgs.
USPTO, Examiner Interview Summary, U.S. Appl. No. 14/829,142, dated Feb. 23, 2018, 3 pgs.
USPTO, Examiner Interview Summary, U.S. Appl. No. 14/829,142, dated Jun. 19, 2018, 3 pgs.
USPTO, Examiner Interview Summary, U.S. Appl. No. 14/829,142, dated Feb. 26, 2019, 3 pgs.

* cited by examiner

PROGRAM AND DEVICE CLASS ENTITLEMENTS IN A MEDIA PLATFORM

PRIORITY UNDER 35 U.S.C. § 119(e) & 37 C.F.R. § 1.78

This nonprovisional application claims priority based upon the following prior United States provisional patent application(s): (i) "PROGRAM AND DEVICE CLASS ENTITLEMENTS IN A MEDIA PLATFORM," Application No. 62/153,036, filed Apr. 27, 2015, in the name(s) of Daniel Biagini, Robert Arritt, Kevin Ma, Mikhail Mikhailov, and Prabhudev Navali; which is hereby incorporated by reference in its entirety.

FIELD OF THE DISCLOSURE

The present disclosure generally relates to communication networks. More particularly, and not by way of any limitation, the present disclosure is directed to a system and method for providing program and device class entitlements in a media platform configured for adaptive bitrate (ABR) media distribution and delivery in a network environment.

BACKGROUND

Content providers have long struggled with how to provide content at a high availability and high performance to their customers in view of bandwidth limitations in content distribution networks. A Content Delivery Network (CDN) can be a large distributed system of servers deployed in multiple data centers connected to the Internet or other public/private communication network. The goal of a CDN is to serve media content (e.g., video/audio/etc.) to User Equipment nodes (UEs) with high availability and high performance. Example UEs that can receive media content are set-top-boxes, television, multimedia computers, and wireless terminals (e.g., smart phones and tablet computers).

The bandwidth requirements for distributing content from content providers to central CDN servers and/or to distributed Edge replication servers have grown tremendously with the proliferation of adaptive streaming content delivery solutions. Adaptive streaming technology is being implemented to handle increasing consumer demands for streaming content from Over The Top (OTT) applications on OTT content servers (e.g., broadcast and on demand movies/TV etc.) across one or more CDNs to UEs having widely differing performance and protocols. Example adaptive streaming technology that continues to be developed includes Apple initiated HTTP Live Streaming (HLS) protocol, Microsoft initiated Smooth Streaming (SS) over HTTP protocol, Adobe initiated Dynamic Streaming protocol, and MPEG Dynamic Adaptive Streaming over HTTP (MPEG DASH) protocol, etc.

Adaptive streaming technology converts a source media content stream into a plurality of content streams having different coding bit rates. A group of multiple bit rate content streams may be transcoded to provide a plurality of groups of multiple bit rate content streams having different distribution container formats that can be required by different streaming protocols used by UEs (e.g., HLS protocol, Smooth Streaming protocol, Dynamic Streaming protocol, MPEG DASH protocol, etc.). Accordingly, a single group of multiple bitrate content streams can result in numerous groups of differently formatted multiple bit rate content streams that need to be distributed and stored at a central CDN server and/or distributed to Edge replication servers to enable high availability and high performance delivery to many different types of UEs.

An example adaptive streaming server system may be configured to accept media content from live sources and/or static file sources, e.g., online content providers such as Hulu®, Netflix®, YouTube®, or Amazon® Prime, etc. Media content from live sources may comprise live programming captured relative to any type of event, e.g., sporting/entertainment/gaming events, concerts, live TV shows, live news broadcasting, etc.

In the context of digital content delivery, such as OTT delivery of video content, there are typically entitlements associated with a given content title, user, device, location, etc. Traditional content protection or Digital Rights Management (DRM) systems support a small number of such entitlements, such as play count, expiration time and output controls, embedding these entitlements into licenses delivered to individual clients. These schemes fall short and are unable to properly support modern online video services, which include not only Video-On-Demand (VOD) but also live programming, with complex business rules.

SUMMARY

The present patent disclosure is broadly directed to systems, methods, apparatuses, devices, and associated non-transitory computer-readable media for providing and effectuating program and device class entitlements in a media environment configured for, by way of illustration, ABR media distribution and/or delivery in a network environment as set forth in this and accompanying materials. Embodiments set forth herein identify individual programs within a live channel and can apply a wide range of entitlements not only to the parent channel but also to each individual program within that channel. The rules for an individual program, if specified, take precedence over channel rules. Furthermore, while some entitlements depend on the particular user/subscriber, there are also content-specific entitlements that apply to content in general and do not depend on the user. The content-specific entitlements for a program can be delivered in the generic manifest available on the CDN, rather than fetched by the client as part of the license, as in traditional DRM systems. The manifest may contain a number of encrypted sets of entitlements, each targeted to a specific class of client devices. Each client selects the set of entitlements that matches the device on which the client is running.

A signal can be sent to the client when the client needs to take user/subscriber information into account when evaluating entitlements. In this case, the client can proactively fetch entitlements from the DRM server by issuing an explicit request. Entitlements delivered directly from the DRM server can either be combined with the entitlements delivered via the manifest or can provide stand-alone entitlements that override all other provided entitlements. All entitlements are delivered and used in a secure manner and cannot be tampered with by an attacker, either while in transit or while on the user device. The list of entitlements supported in this manner is incomparably larger than those supported by traditional DRM systems and can include play count, activation time, expiration time, device type (phone/tablet/browser/STB), playback enabled/disabled on jailbroken devices, network connection type (3g/4g/wifi), hdmi/airplay enabled/disabled, in/out home, in/out country, stream count limits, minimum bitrate, maximum bitrate, fast-forward enabled/disabled, rewind enabled/disabled, maximum bitrate on a jailbroken device, minimum/maximum play position, maximum number of ads to play, session shift enabled/disabled, etc. New entitlements can be added as necessary or desired.

In one aspect, an embodiment of a method operable on a user device for enforcing program entitlements in a broadcast stream is disclosed. The claimed method comprises, inter alia, receiving a manifest containing first program information for a first program in the broadcast stream, the first program information providing a first program entitlement block; and using entitlements specified in the first program entitlement block to enforce entitlements for the first program.

In another aspect, an embodiment of a method operable on a user device for enforcing program entitlements in a broadcast stream is disclosed. The claimed embodiment involves, inter alia, receiving channel entitlements for a channel in the broadcast stream; receiving program information for a first program on the channel; determining whether a first program entitlement block is provided in the program information; if the first program entitlement block is provided, using entitlements specified in the first program entitlement block to enforce entitlements for the first program; and if the first program entitlement block is not provided, using the channel entitlements to enforce entitlements for the first program.

In another aspect, an embodiment of an apparatus for enforcing program entitlements in a broadcast stream is disclosed. The claimed embodiment comprises, inter alia, one or more one or more processors operably coupled to a memory having a sequence of program instructions which, when executed by the one or more processors, perform the following: receiving a manifest containing first program information for a first program in the broadcast stream, the first program information providing a first program entitlement block; and using entitlements specified in the first program entitlement block to enforce entitlements for the first program. Further features of the various embodiments are as claimed in the dependent claims.

Advantages of the present invention include, but are not limited to:

- Digital rights can be applied not only to a streaming channel, but also to specific programs within the channel;
- No new communications are necessary to provide the rights, providing a more scalable solution;
- Different digital rights can be applied to different classes of devices; and
- A much broader variety of digital rights can be enforced using the disclosed methods and devices.

Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
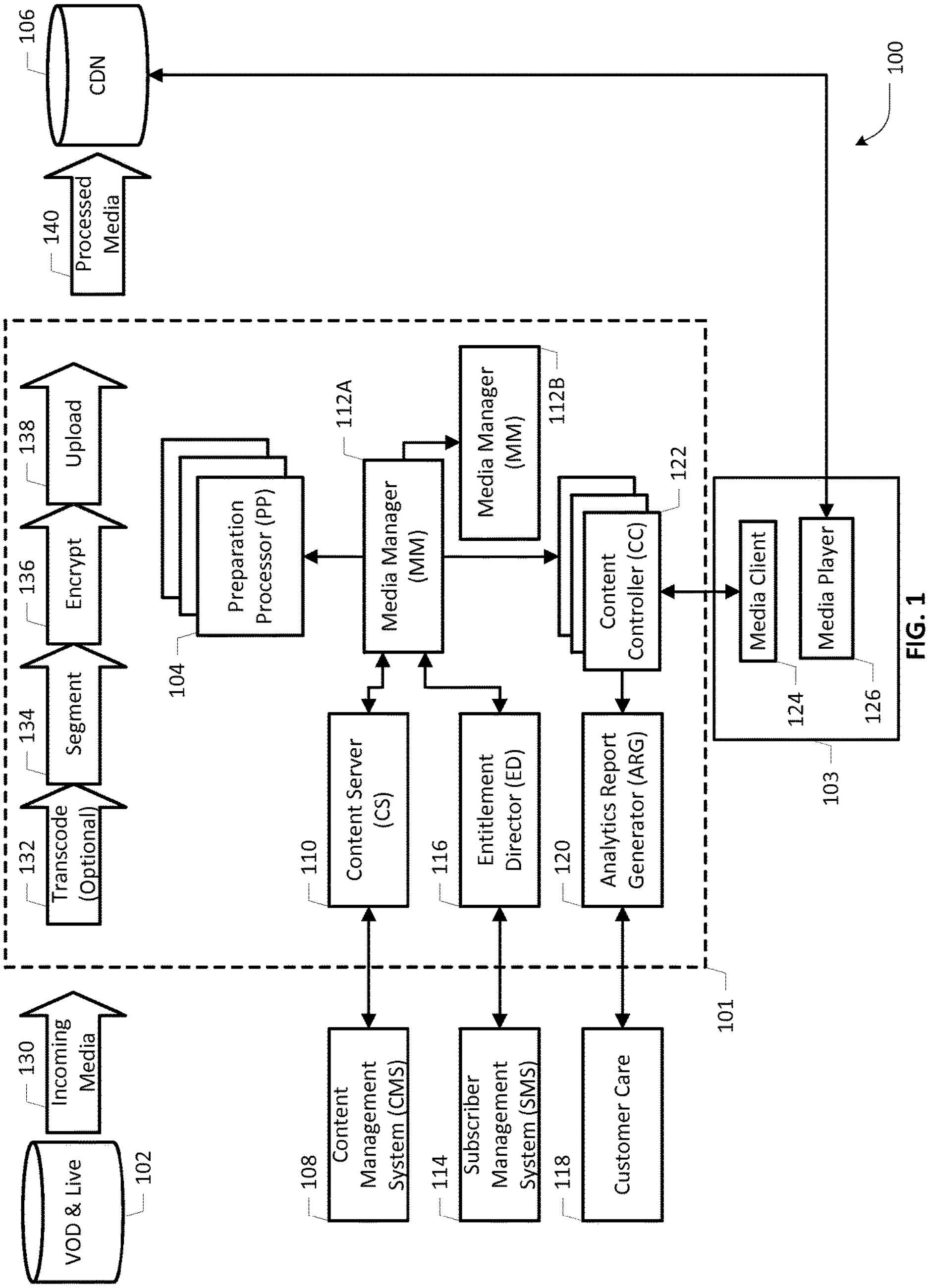
FIG. 1 depicts an embodiment of a media environment wherein an embodiment of the present invention may be practiced.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to one or more subscribers. As such, some network elements may be disposed in a wireless/wireline telecommunications network or a cable provider network whereas other network elements may be disposed in a public packet-switched network infrastructure (e.g., the Internet or worldwide web, also sometimes referred to as the Cloud), private packet-switched network infrastructures such as Intranets and enterprise networks, as well as service provider network infrastructures, any of which may span or involve a variety of access networks and core networks in a hierarchical arrangement. Where digital content or assets are consumed by the subscribers, network elements hosting such digital content or assets may be disposed in suitable CDN infrastructures. Accordingly, some network elements may comprise "multiple services network elements" that provide support for multiple network-based functions.

In general, the terms "content" or "content file" as used in reference to at least some embodiments of the present patent disclosure may include digital assets and program assets such as any type of audio/video (NV) content or program segment, live streaming or static (e.g., recorded over-the-air free network TV shows or programs, pay TV broadcast programs via cable networks or satellite networks, free-to-air satellite TV shows, IPTV programs, etc.), OTT and VOD or Movie-on-Demand (MOD) shows or programs, time-shifted TV (TSTV) content, locally stored content or network-stored content, as well as other content assets provided by content publishers, owners or providers, including but not limited to software files, executable computer code or programs, online electronic games, Internet radio shows/programs, entertainment programs, educational programs, movies, music video programs, and the like. Further, the content may be delivered, received or provided to the UE devices using broadcast cable TV, local TV, switched digital video (SDV) TV, satellite TV, broadband Internet, via one or more ABR streaming technologies. Example subscriber end stations or client devices may comprise any device configured to execute, inter alia, a streaming client application (e.g., an ABR streaming client application) for receiving content from one or more content providers, e.g., via a broadband access network. Such client devices may therefore include set-top boxes (STBs) with or without integrated cable cards, TVs, personal/digital video recorders (PVR/DVRs), networked media projectors, portable laptops, netbooks, palm tops, tablets, smartphones, video phones, mobile/wireless user equipment, portable media players, portable gaming systems or consoles (such as the Wii®, Play Station 3®, etc.) and the like that may access or consume content/services provided via a suitable dynamic packager network architecture for purposes of one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Turning to the figures now, FIG. 1 depicts an embodiment of a media environment 100 wherein the present invention may be practiced. Media platform 101 sits logically between a service provider's back office and client devices 103, and provides live streaming media to client device 103 through CDNs such as CDN 106. In media environment 100, the service provider's back office includes Content Management System (CMS) 108, Subscriber Management Systems (SMS) 114 and Customer Care system 118. CMS 108 manages the acquisition of content and provides bookkeeping of digital assets and associated business rules and service profiles. SMS 114 receives and stores all subscriber-related information and, in conjunction with a billing system, is the arbiter of which subscribers have access to specific elements of content. Customer Care system 118 provides billing and revenue management. Each of these back office servers provides information that is critical to the real-time provisioning of streaming media to customers, but none have a presence in the video session setup path. Therefore, these servers are not aware of device authentication and runtime analytics, such as usage and actual device profile for client device 103, to effectively enforce entitlements. Media platform 101 provides integration of CMS, SMS and Customer Care functions into the authentication pathway for client devices and the delivery of live streaming media to those clients through Content Server (CS) 110, Entitlement Director (ED) 116, and Analytics Report Generator (ARG) respectively. Each of CS 110, ED 116 and ARG 120 communicates with its respective back office functionality and also communicates with either Media Manager (MM) 112A or Content Controller (CC) 122. Media Manager 112A and its backup, MM 112B, act as an administrator to receive electronic programming data and subscriber information and authenticates user access based on correlating device, user and content rights. Content Controller 122 is a DRM license server that interacts with client devices to support content delivery based on client requests and service mediation. In at least one embodiment, an external rights server can push rights information to MM 112. In at least one embodiment, CC 122 can perform call outs to an external rights server in order to provide entitlements in response to client requests.

Media platform 101 also receives incoming media 130 for each provided channel from a content provider 102, which may provide both stored VOD and live media. Within media platform 101, one or more preparation processors (PP) 104 act on the incoming media 130. PP 104 can transcode (132) the media into multiple bitrates to support ABR delivery where necessary, segment (134) the media for transport, and encrypt (136) and upload (138) the segmented media for delivery to CDN 106 as processed media 140 that is ready for distribution on one or more channels of live streaming media. At the appropriate time, CDN 106 streams the processed media to requesting client device 103. The final piece of media environment 100 is client device(s) 103. Although only one client device is shown in this example, it will be understood that CC 122 interacts with numerous client devices. The traditional client device for streaming media has been the STB for in-home television viewing. However, as customers increasingly demand access to available content on mobile devices, client device 103 now includes unmanaged devices such as laptops, smartphones, tablets, smart TVs, game consoles and DVD players. Since these devices are not preregistered or preconfigured to receive subscribed services, service delivery to client device 103 must be dynamically detected, authenticated and controlled on demand based on their entitlement. Client device 103 typically contains a media client 124, which interacts with CC 122, as well as media player 126, which may be provided as part of the operating system of the client device.

In at least one embodiment, media platform 101 is configured to support program entitlements for use during certain VOD playback modes (e.g., catch-up & network PVR (nPVR)) only. In at least one embodiment, media platform 101 is configured to provide support for media program based entitlements applied during live, e.g., linear, playback mode. Live program entitlements may be used to enforce playback business rules, which are required for compliance of content rights agreements. In at least one embodiment, program entitlements can be signaled to MC 124 for each program occurrence on the linear stream. In at least one embodiment, MC 124 is configured to dynamically update the current entitlement rule-set upon the start of the corresponding program and to trigger enforcement using the updated rules. In at least one embodiment, restrictions such as out-of-home playback are supported on a per program basis.

Figure 2:
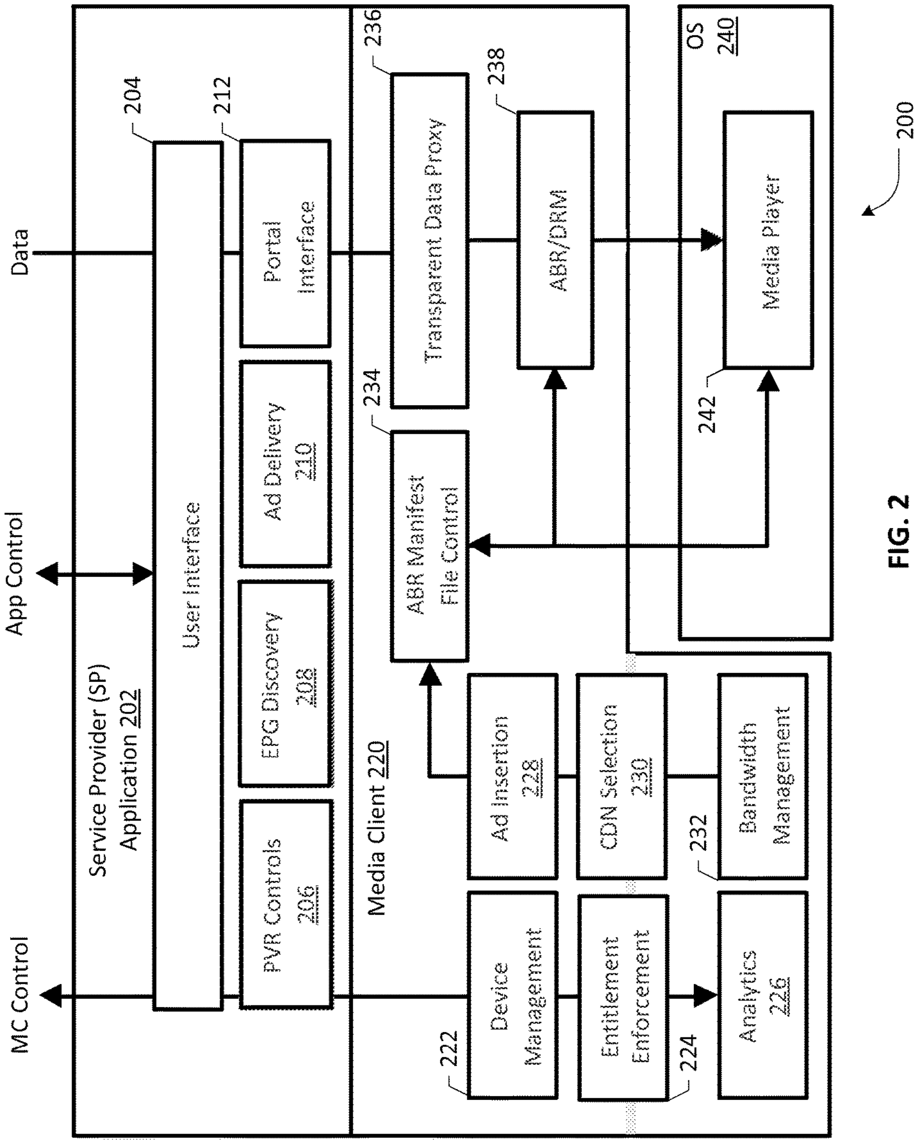
FIG. 2 depicts a block diagram of a client device wherein an embodiment of the present invention may be practiced.

FIG. 2 provides a simplified block diagram of a client device 200, such as client device 103, showing the components involved in receipt and playback of streaming media, specifically Service Provider Application 202, Media Client (MC) 220 and Media Player 242. SP Application 202 provides communication with a user through User Interface 204, which supports login of the user and provides programming information to the user. In at least one embodiment SP Application 202 pairs itself with an STB; SP Application 202 can then determine whether client device 200 is in-home or—out-of-home and provide that information to MC 220. The Service Provider Application 202 also contains PVR Controls 206, EPG Discovery 208, Ad Delivery 210 and Portal Interface 212. Media client 220, which is one embodiment of media client 124, manages authentication of client device 200 with media platform 101, retrieves content, plays the content on media player 242, and provides local enforcement of DRM through its connection to media player 242, which is part of the operating system (OS) 240 of the client device 200. Media client 220 also contains modules to perform Device Management 222, Entitlement Enforcement 224, Analytics 226, Ad Insertion 228, CDN Selection 230 and Bandwidth Management 232. ABR Manifest File Control 234 receives the manifest file that is provided for a requested channel and is able to coordinate changes in the requested bitrate for streaming. Transparent Data Proxy 236 provides connection between MC 220 and the Internet and ABR/DRM 238 communicates with CC 122 for authentication, exchanges channel information (including entitlements associated with the channel) and subscriber information with CC 122, and when a subscriber override is in effect, requests entitlements for each program from CC 122.

MC 220 can apply at least the following example program entitlements dynamically at program boundaries; in at least one embodiment, these entitlements can be based on device classification:

- Supported device types, e.g., phone, tablet, browser;
- Jail broken disabled (jail breaking is a privilege escalation process of removing system restrictions e.g., hardware, firmware, etc. on a device OS, e.g., iOS, which permits root access to the OS file system and manager, allowing download of additional applications, extensions, etc. that may be unofficial);
- Network connection type (e.g., 3G/4G, Wifi);
- HDMI/Airplay disabled; and
- Playback enabled/disabled.

Additional entitlements, which can't be detected within MC 220, can be detected and/or enforced in CC 122. In at least one embodiment, MC 220 is configured for this purposes to utilize a beaconing mechanism, i.e., keep-alive messaging that regularly exchanges information with CC 122 regarding, e.g., content consumption, user overrides, etc. In at least one embodiment, these entitlements can include at least:

- Stream count limits;
- In/Out home; and
- In/Out country. In at least one embodiment this entitlement is implemented via a rights callout to an external system.

In at least one embodiment, a set of entitlements uses a 5-tuple that includes primary (a.k.a. account), user_token, device_id, media Unique Identification Number (UID) and media group to determine which entitlement properties or rights are applied to a given playback request. In at least one embodiment, an additional entitlement targeting mechanism is provided to allow more granular application of program entitlements on specific types of devices, as well as the potential to apply other types of entitlements. This mechanism is similar to an MP Device Class object, which allows classification based on at least the following device attributes:

- OS, e.g., iOS, Android, Browsers, Win Phone;
- OS version, which can include compound version comparisons;
- Manufacturer; and
- Model.

In at least one embodiment, device classification is a string matching qualifier with wildcard support that the MC 124 and/or CC 122 uses to determine whether a given rule applies to a target user device.

There can be instances where it is desirable for the entitlements of a specific subscriber, e.g., a combination of primary, user and device, to override the content entitlements of a program. In at least one embodiment, a mechanism is provided to force MC 124 to query CC 122 for entitlement updates on a per program basis. In at least one embodiment, MC 124 does not wait until the moment right before or after a program change occurs to callout to CC 122 for an entitlements update.

In at least one embodiment of the disclosure, content owners can restrict certain content from being played from outside the home. In-home-only playback can be controlled by at least the following two mechanisms:

- Matching the source IP address of client messages against a known home gateway IP address in the CC; and
- Application controlled STB pairing as means of in-home detection.

Scalability of signaling for content program entitlements can be accomplished by limiting the amount of communication between MC 124 and CC 122 required for entitlements messaging. Embedding the entitlements, as well as any associated device classifiers, within the video stream, e.g., inline, in-band, or in-stream signaling, may advantageously provide the signaling of content entitlements without any additional MC-CC interactions. Preparation processor video processing outputs a manifest file which contains stream metadata. According to this disclosure, the manifest file is configured to deliver content entitlement and device classifying data to clients with minimal overhead on CC 122. In at least one embodiment, the manifest file is also utilized to signal many value-added features, e.g. ad-insertion, parental controls, timeshifting features, etc. In at least one embodiment, manifests are provided in HLS m3u8 format; in at least one embodiment the manifest entitlement signaling approach is provided in MPEG DASH mpd files or extended to other manifest types.

Figure 3:
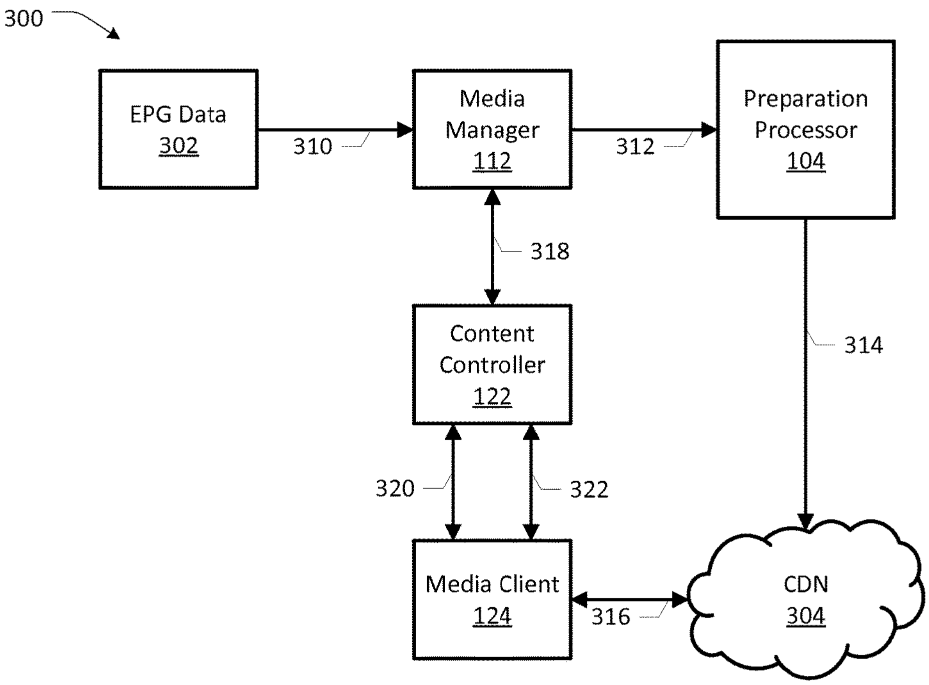
FIG. 3 depicts the data flow between components of the media environment according to an embodiment of the present patent application.

FIG. 3 depicts an embodiment of the data flow between components of the media environment for program entitlement delivery. Media Manager 112, Content Controller 122 and Preparation Processor 104 are each part of media platform 101, which is connected to both CDN 106 and Media Client 124. An external EPG data source 302 pushes program data and entitlement information into Media Manager 112 via a media/program Application Programming Interface (API) 310. A program scheduler (not specifically shown), which may be operating at or otherwise associated with MM 112, is responsible for provisioning the next program at PP 104. It should be appreciated that a network node/functionality may be configured as a recorder, transcoder and uploader (RTU) (not specifically shown) associated with PP node 104 that is operative to fetch original content file from a remote system, transcode it into various bitrates appropriate for the target client platforms, and then upload transcoded and segmented files to a Content Distribution Network 304 or Origin Server. The program scheduler can retrieve the corresponding entitlements, based on program media UID & program's media groups, and pass an entitlements "block" to the RTU via a ProgramInfo message over communication link 312. This may occur for both Timeshift enabled channels ("out-of-band" segmentation) and legacy live streams.

The RTU functionality passes the ProgramInfo message to a segmenter process (not specifically shown), which may be operating at or otherwise associated with PP 104. The segmenter may be configured to write the entitlements into the manifest file. If the channel is running in program segmentation mode then the entitlements block may be placed at the top of the manifest file. If the channel is in sliding window mode the entitlements may be placed at the top of the file and after any program boundary indicators, including the program media UID, start/end times, and any program parental control rating that was passed. The manifest file and video content is then sent to CDN 106 over communication link 314. MC 124 performs a playback request using a suitable "client/roll" API, shown as communication link 320. The DRM object that is returned from CC 122 contains the entitlements for the parent channel. The object may also contain an additional override flag to support subscriber_check, a subscriber override option. In at least one embodiment, MC 124 is configured to retrieve entitlements for the next program via a DRM token retrieval API or a beacon API. In at least one embodiment, various MCs are configured to spread the next program entitlement lookup over different beacons to help spread the load out over the full program duration.

For program entitlement signaling, if subscriber_check is false or not available, MC 124 parses ProgramInfo comments from the manifest file, and iterates through the entitlement objects, choosing the first object whose Device Class matches the local platform attributes. If subscriber_check is true, MC 220 calls client/token retrieval to retrieve the entitlements for the next program, preferably before the end_time of the current program. End_time and next program UID can both be found in the PROGRAM-INFO tag of the bitrate manifest files. The DRM token retrieval API call, shown as communication link 322, may contain the media UID of the next program in order to retrieve the full set of entitlements for that next program. In at least one embodiment, the token retrieval API is configured to perform a subscriber/content entitlement merge for that program and return a single DRM Object with the corresponding rights and the first encryption key for the program. If key rotation is disabled, the key may be the same.

In at least one embodiment, the RTU and segmenter adds the necessary Program-Info tag, including entitlements, to the manifest files when the Preparation Processor node 104 is operating in either packager or transcoder mode. Similar manifest entitlement support can also be added to a Just-In-Time Packager (JITP) manifest processing to allow for integrated Playback Business Rules (PBR) with suitable PP or packaging implementations.

In at least one embodiment, the top of the manifest contains PROGRAM-INFO tags for 3 programs: previous, current and next. Each PROGRAM-INFO can include at least the following information:

- Program ID (PID);
- Program Name;
- Start Time in Coordinated Universal Time (UTC);
- Duration;
- Media UID (MUID); and
- Entitlement Block.

The PROGRAM-INFO tag can include an Entitlement block: ENTITLE="<entitlement-block>", and also a signature hash to allow for quick change detection of the block: ENTITLE_HASH="<signature>". Both values may be set to "−1" to signal no entitlements for a program. The manifest file is protected by manifest cryptographic signing and verification workflow.

In at least one embodiment, the entitlements block includes multiple entitlement objects, each with an optional Device Class (DC) Target. Each entitlement with an association to the program, either directly or via media group, can be merged using an exemplary entitlement rules precedence engine, e.g., wherein a lower priority numerical value indicates a higher rule precedence. In at least one embodiment, different DC targets do not merge into a single entitlement; instead each distinct DC target carries a merged entitlement set for the target. In at least one embodiment, multiple sets of merged entitlements for different DC targets are combined to form the entitlements block. Maintaining an existing DRM token object format can allow MC 124 to reuse existing parsing and handling code. In at least one embodiment, MC 124 parses the encoded Device Class definitions of each Entitlement Object within the Entitlement Block until a first match is found. The first matching object in the block for the next program is chosen as the new set of entitlements.

In at least one embodiment, the combined Device Class and Entitlement object string has the following form:

<device-class>::<entitlement-object>

The below example illustrates the use-case of a program (Prog1) being blocked on all Android phone devices, and a second program (Prog2) being blocked on all Android phones and Android tablets of a particular manufacturer. Both Prog1 and Prog2 belong to a MediaGroup, MG1. The example assumes that Device Classes "DC1" and "DC2" have the following definitions:

Device Class: DC1
 OS: Android
 Version: *
 Manufacturer: *
 Model: *

Device Class: DC2
 OS: Android
 Version: *
 Manufacturer: Samsung
 Model: Galaxy*

TABLE 1

Media Rights Example

| Media UID | Media Group | Device Class | Phone blocked | Tablet blocked | Desktop blocked | Priority |
|---|---|---|---|---|---|---|
| Prog1 | | DC1 | T | F | F | 20 |
| Prog2 | | DC1 | T | F | F | 20 |
| Prog2 | | DC2 | T | T | F | 20 |
| | MG1 | | F | F | F | 100 |

The corresponding entitlement block for Prog1 may contain the following two Entitlement Objects, the first for DC1 and the second having a NULL DC (wildcard, applies to all):

Prog1 Entitlement Block
 <DC1>::1#0#0
 ::0#0#0

Similarly, the Prog2 block contains three Entitlement objects: Prog2 Entitlement Block
 <DC1>::1#0#0
 <DC2>::1#1#0
 ::0#0#0

It should be appreciated that the Entitlement Object encoding in the above example is shortened for simplicity to only the 3 specified binary values; the actual encoding may be much longer, may contain the full object values, and are always encrypted. <DC1> and <DC2> are placeholders for the Device Class definitions, as set forth below.

MC 124 is responsible for parsing the encoded Device Class definitions of each Entitlement Object within the Entitlement Block until a match is found. In at least one embodiment, the first matching object in the block is chosen to provide the new set of entitlements to apply starting at the specified start time in the Program Info of the manifest file. If a signature hash is utilized, MC 124 is operable to determine whether the hash value for the next program is the same as the hash value for the current program. If the two values are equal, there is no change between the two sets of entitlements. In this embodiment, MC 124 is operable to skip parsing of the Entitlement Block and to apply the entitlements for the current program to the next program. In at least one embodiment, specific browsers and/or operating systems may be targeted using different targeting mechanisms.

In at least one embodiment, Device Class encoding is in the form:

<DC-version>:<OS string>:<Version match range>: <Manufacturer string>:<Model string>

The DC-version may be a constant '1' on an example implementation. Each string component of the class, e.g., OS, Manufacturer and Model, can be used in a case insensitive or case sensitive comparison to the local device attributes. In at least one embodiment, a wildcard match for the end of a string is specified using an asterisk ('*') in the class component. In at least one embodiment, the string is required to be an exact match up, until the optional wildcard character, to the value returned by the client platform for a class to qualify as a match. A<Version match range> component allows two forms:

- Exact match—if the supplied <version match range> string doesn't contain a '>' or '<' character then the string is matched to the exact version returned by the appropriate platform; and
- GT/LT/GTE/LTE match—if the supplied <version match range> string contains a '>' or '<' value, the supplied version is to be compared to the platform version using the appropriate numerical comparison operator.

A subscriber override of content entitlements can be signaled by a property or parameter called, e.g., subscriber_check in a DRM Rights Object that is returned from the response to the client/roll API mentioned previously. In at least one embodiment when set, MC 124 can ignore the program entitlements contained within the manifest Entitlement Blocks. In at least one embodiment, MC 124 periodically utilizes an API to CC 122 to retrieve the computed entitlements for each program. The CC API call can be done at a random time before the start of the next program in order to amortize the load on CC 122 over the full time span of the current program.

When subscriber_check is false, MC 124 and the related DRM Agent 238 may not make any additional rights object updates for that session, other than the potential updates signaled through the manifest. In at least one embodiment, DRM Agent 238 can use the entitlements for the channel as a fallback object if there is an error in the program entitlement from the manifest. In at least one embodiment, when subscriber_check is true, MC 124 refreshes rights via a token retrieval API call before each program boundary. This call may use a program_media_uid query string parameter to specify the program's media_uid.

Figure 4:
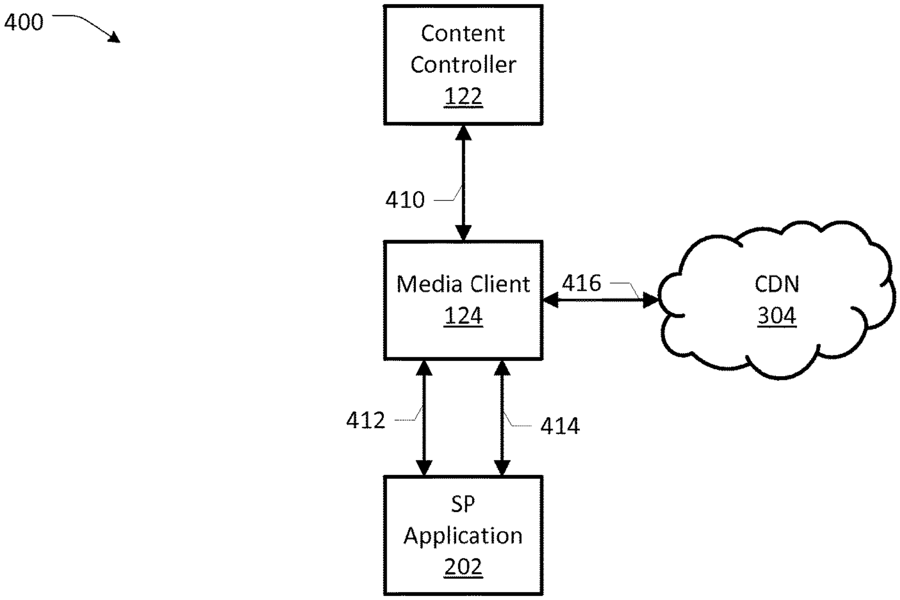
FIG. 4 depicts communications between various components of the media environment according to an embodiment of the present patent application.

In at least one embodiment, media platform 101 and media client 124 are configured to support an application such as in/out home detection in order to enforce in-home-only playback restrictions. FIG. 4 depicts an example architecture for facilitating in-home-only playback restrictions, wherein appropriate steps/blocks/acts may take place to effectuate the applicable restrictions. In at least one embodiment, an entitlement parameter or variable out_of_home_blocked is used to transmit this feature. The out_of_home_blocked entitlement can be applied to targets similar to or compatible with an existing suite of entitlement properties. Operators can use the media/rights API to set this entitlement or use rights callout to return the property. In at least one embodiment, MC 124 handles out_of_home_blocked property changes on a per program basis, signaled either through the manifest, via communication link 416, or via the subscriber override mechanism, signaled via communication link 410. MC 124 can signal SP Application 202 when out_of_home_blocked is true to enable SP Application 202 to provide in/out home detection. This signal is shown in the figure as communication link 412. In at least one embodiment, SP Application 202 use an API called setHomeStatus( ), shown as communication 414, to signal whether the client is in or out of home, allowing MC 124 and DRM Agent 238 to restrict or allow playback as appropriate. In at least one embodiment, MC 124 is configured to treat SP Application 202 as in-home, i.e., fail open, in the default state.

In at least one embodiment, a media/rights API is configured to support device class targeting features set forth herein, as well as supporting desired additional entitlements. In at least one embodiment, the media/rights API is provided with the following signature, including one or more new parameters:

POST http://hostname:2010/media/rights?owner_uid=uid
[&user_token=token[&device_id=id]
|&primary=acct_group]
[&media_uid=uid|&media_group=name]
[&device_class_name=device_class]

where:

owner_uid Unique string that identifies the owner of the media and/or the owner associated with the client.

user_token (Optional) Opaque token (sequence of characters) that uniquely identifies a given user. In practice, the user token could be a user name chosen by the user when the user creates an account with the SMS, or a token (such as a cookie) generated by the SMS when the user logs in.

device_id (Optional) Unique string that identifies the client device to which the client rights apply.

primary (Optional) Primary client account group to which the client rights apply.media_uid (Optional) Unique string that identifies the media to which the client rights apply.

media_group (Optional) Name of a media group to which the client rights apply.

device_class (Optional) Name of a Device Class that may be used as an additional device targeting qualifier to which the rights may apply. More information on Device Class can be found herein.

In at least one embodiment, device_class is supported only for "Content Rights", i.e., rights which don't have any subscriber targets specified.

In at least one embodiment, the following payload XML fields are configured to support new entitlements:

| Field | Description |
|---|---|
| out_of_home_blocked | (Optional) [true\|false\|unspecified] User ability to playback content when out of the home. Out of home status is determined via the client application, and set via MC API. |

-continued

| Field | Description |
|---|---|
| subscriber_check | (Optional)) [true\|false\|unspecified] Rights calculation and check may be performed for every program on a linear channel. This allows for subscriber based override of Content Rights on a per program/schedule basis. |

CC Rights callout payload response parsing can be configured to handle the inclusion of the additional rights properties such as, e.g., out_of_home_blocked and subscriber_check, as set forth hereinabove. In at least one embodiment, a CC DRM token retrieval API is used by MC 124 to retrieve media DRM tokens. In at least one embodiment, a request from MC 124 to CC 122 can be generated to retrieve media meta information along with entitlements and content decryption key, which can be referred to as a roll request. In at least one embodiment, the response from CC 122 is in XML, containing various pieces of information describing for MC 124 where to find media segments, what bitrates are available, etc. In at least one embodiment, entitlements and/or a content decryption key are contained in the encrypted DRM token returned in one of the XML tags. The applicable API signature can be modified to support retrieval of program based entitlements for the "subscriber_check=true" case.

POST http://hostname:2010/client/rollite?owner_uid=uid
&media_uid=uid&seq=key_sequence
[&program_media_uid=program_uid]
[&primary=accountId]

where:

owner_uid Unique string that identifies the owner of the media and the owner associated with the client.

media_uid Unique media UID that identifies the media (in the case of live playback with subscriber_check mode, this may be the media_uid for the channel).

seq Key sequence id program_media_uid (Optional) Unique media UID of a program instance on a channel for which the rights may be calculated.

primary (Optional) Account identifier (aka, client account group id, primary account group id, account id).

Figure 5A:
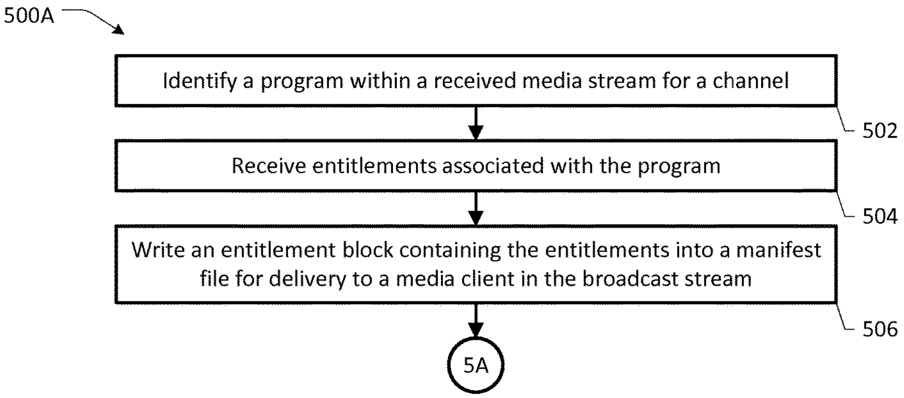
FIGS. 5A-5C depict an illustrative method for providing program and device class entitlements to a media client according to an embodiment of the present patent application.
Figure 5B:
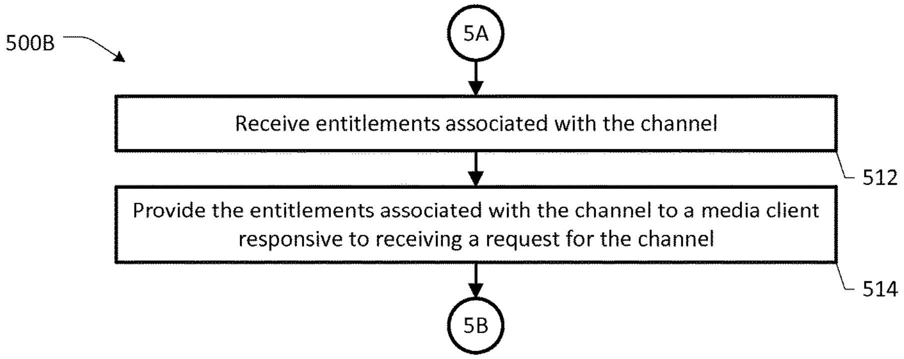
Figure 5C:
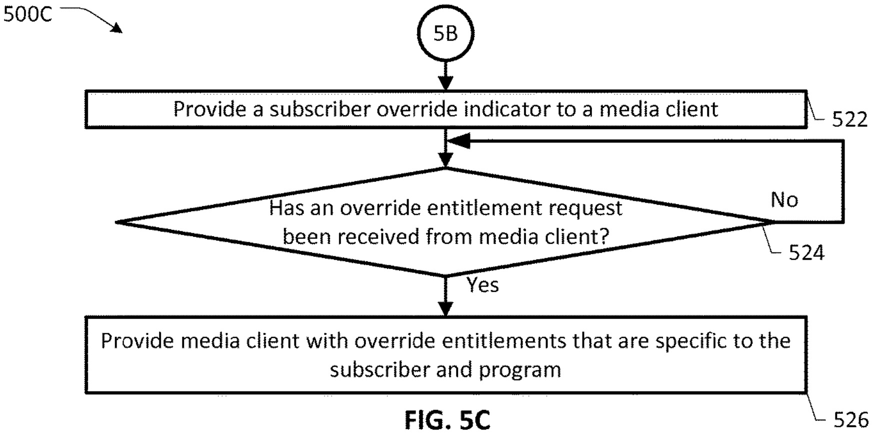

FIGS. 5A-5C depict a series of flowcharts of an illustrative method at a network node for providing program and device class entitlements to a media client according to an embodiment of the present patent application. Flowchart 500A begins with a network node identifying (502) a program within a received media stream for a channel. The node also receives (504) the entitlements associated with the program. As noted above, the entitlements can be received from a media source, e.g., at the time the media is received. Finally, the node writes (506) an entitlement block containing the entitlements into a manifest file for delivery to a media client in the live broadcast stream. In at least one embodiment, it may not be necessary or desirable to provide program entitlements for each program on a channel. In this case, entitlements associated with the channel are provided as shown in flowchart 500B. This aspect of the method includes receiving (512) entitlements associated with the channel and providing (514) the channel entitlements to a media client in response to receiving a playback request for the channel from the media client. In this manner, when a program's entitlements are missing or otherwise not available, the client is able to utilize the channel entitlements to enforce entitlements for the program.

If a subscriber_check or subscriber override function is provided, the method continues in flowchart 500C. The network node provides (522) a subscriber override indicator to a media client, e.g., the subscriber_check indicator provided with the channel manifest during communications between MC 124 and CC 122. The network node then determines (524) whether an override entitlement request for a next program has been received from MC 220. If not, the node continues to wait on a request. If a subscriber override request has been received, the network node then provides (526) the media client with override entitlements that are specific to the program and the media client.

Figure 6A:
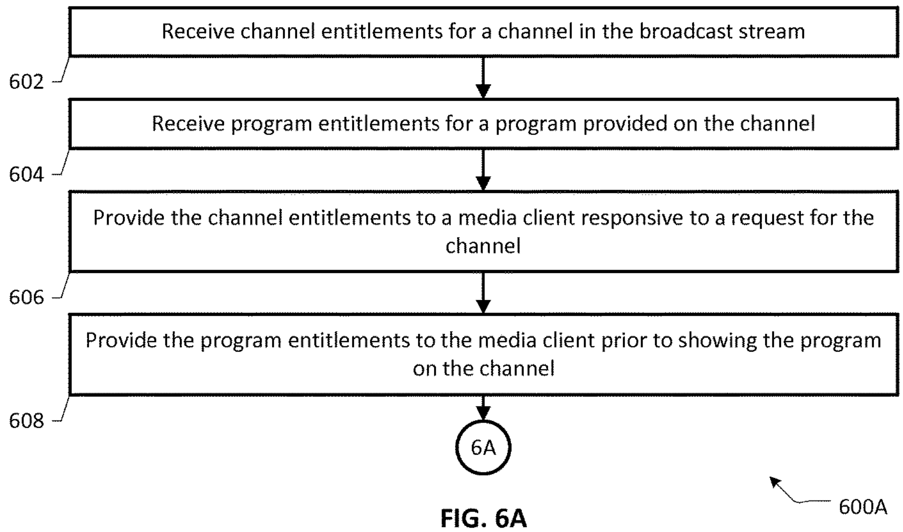
FIGS. 6A-6B depict an illustrative method for providing program and device class entitlements to a media client according to an embodiment of the present patent application.
Figure 6B:
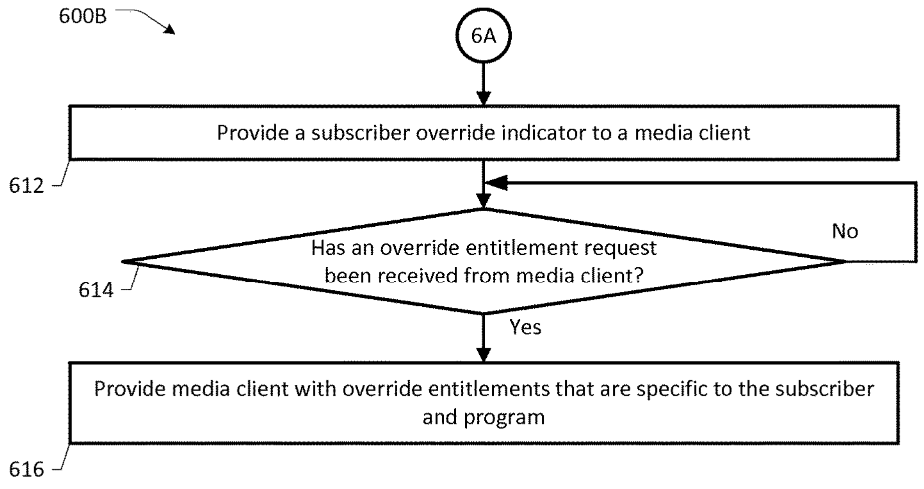

FIGS. 6A-6B depict another series of flowcharts of an illustrative method at a network node for providing program entitlements to a media client according to an embodiment of the present patent application. In flowchart 600A, a network node receives (602) channel entitlements for a channel in the broadcast stream. These channel entitlements provide entitlements that apply to all programs on the channel. The network node also receives (604) program entitlements for a program provided on the channel, e.g., by writing one or more entitlements into a manifest file. The network node can receive these program entitlements for as many or as few programs as desired. Program entitlements, if provided, will override the channel entitlements. The network node then ensures that the channel entitlements are provided (606) to a media client responsive to a request for the channel. In at least one embodiment, the channel entitlements are sent to CC 122, which can provide the channel entitlements to MC 124 when a request to join a channel is received. The node also ensures that program entitlements are provided (608) to the media client prior to showing the program on the channel. In at least one embodiment, the entitlement block is included in a manifest that is sent to CDN 106. CDN 106 then provides the manifest and media to media client 124 at an appropriate time.

The ability to override the program manifest can be provided as shown in flowchart 600B. The network node, such as CC 122, provides (612) a subscriber override indicator to the media client, such as media client 124. In at least one embodiment, the subscriber override indicator is provided to the media client when a new session begins, e.g., at the time a channel is requested. Alternatively, in one embodiment, the subscriber override indicator is provided in a beaconing message between, e.g., CC 122 and MC 124. The network node then waits to determine (614) whether an override entitlement request for a next program has been received from a media client. If not, the network node continues to wait, but if an override entitlement request has been received, the network node provides (616) the media client with override entitlements that are specific to the subscriber and the program.

Figure 7A:
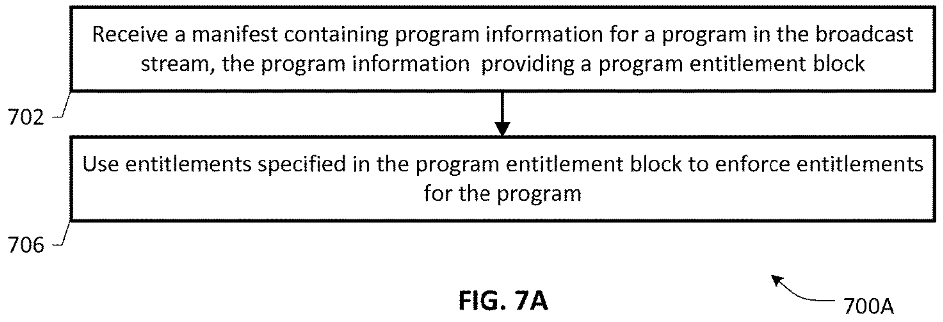
FIG. 7A depicts an illustrative method for enforcing entitlements at a media client according to an embodiment of the present patent application.
Figure 7B:
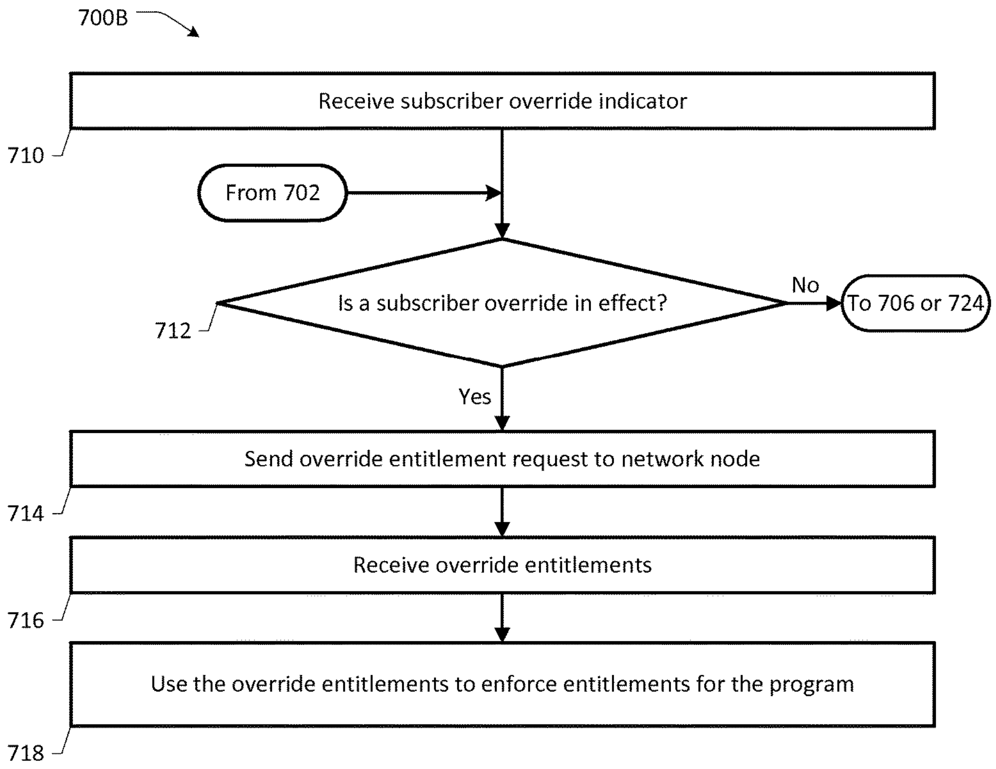
FIGS. 7B-7E depict additional aspects that can be practiced in combination with the method of FIG. 7A according to an embodiment of the present patent application.
Figure 7C:
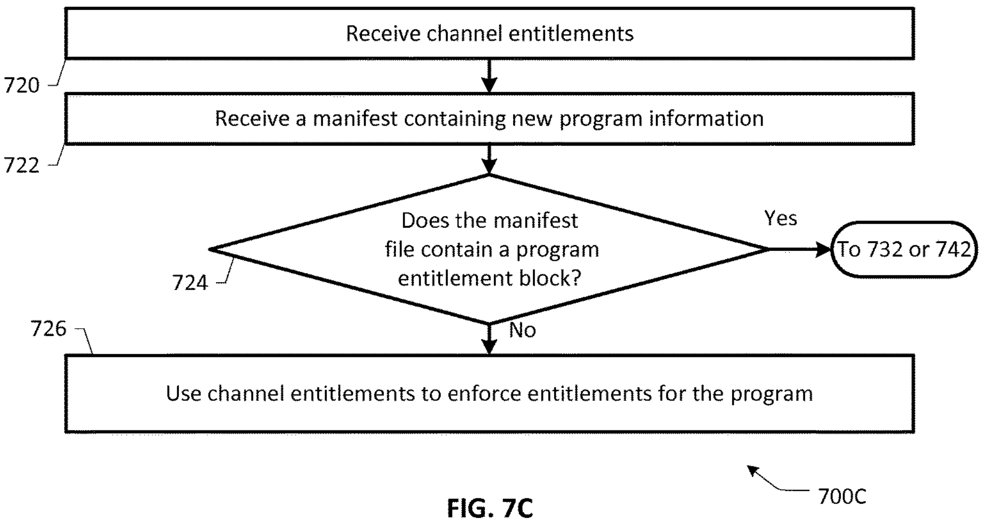
Figure 7D:
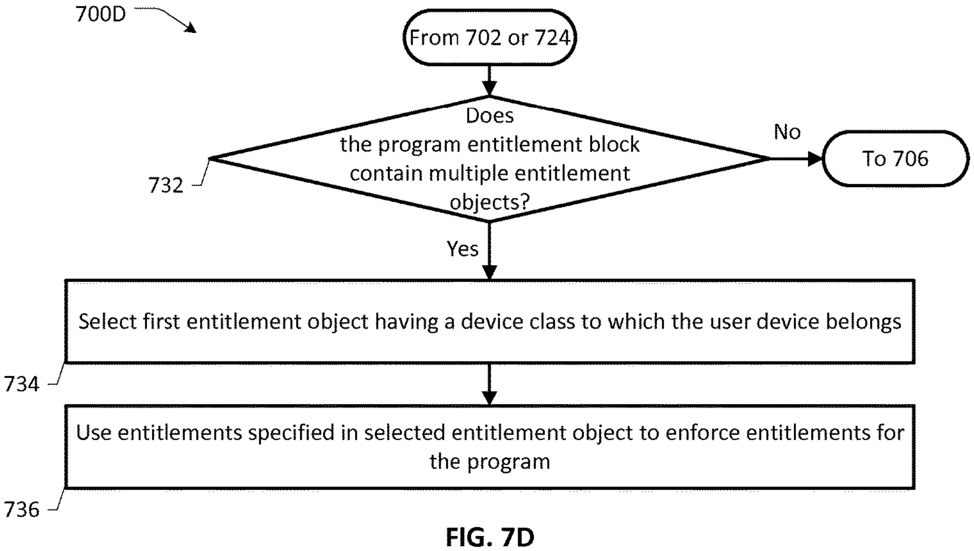
Figure 7E:
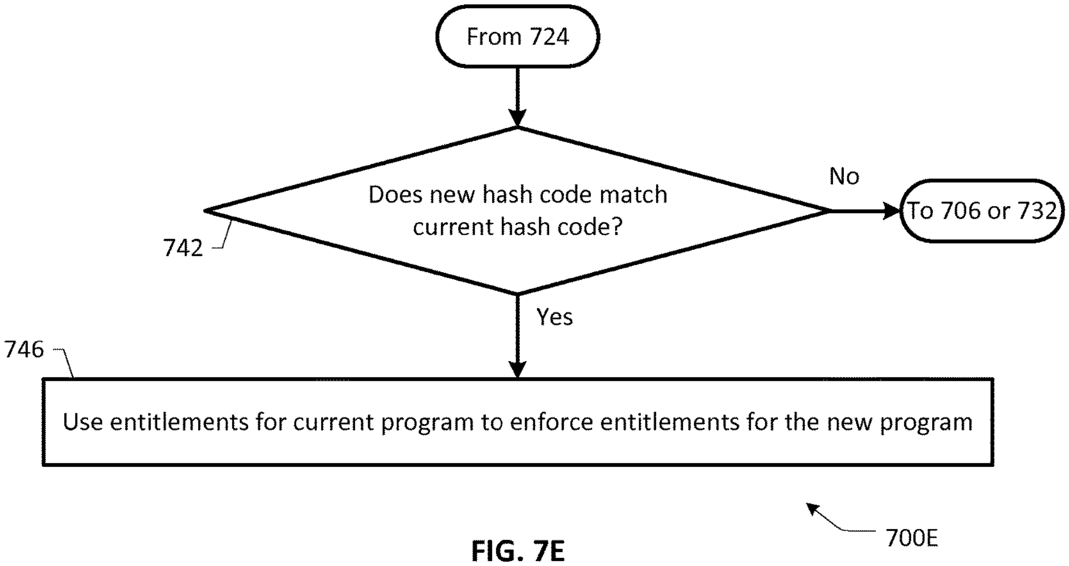

FIG. 7A depicts flowchart 700A, which is directed to a method operating on a user device for enforcing program entitlements in a broadcast stream. A media client, such as media client 124, receives (702) a manifest for a program in the live broadcast stream; the manifest providing a program entitlement block. The media client then uses (706) the entitlements specified in the program entitlement block to enforce entitlements for the program.

FIGS. 7B-7E depict flowcharts 700B-700E of additional aspects of the method that may be practiced in combination with the method of FIG. 7A. The disclosure has noted that along with the program entitlements, the media platform can also provide channel entitlements that provide default entitlement values and override entitlements that can supersede the program entitlements, as well as using device class entitlements to provide multiple entitlement objects in the manifest. While it can be beneficial to practice all of these elements in a single embodiment, it is not necessary to do so. Accordingly, the process in the media client may proceed along several paths in dependence on which elements are included in any embodiment. Flowchart 700B deals with the use of a subscriber override. If this option is utilized in a system, media client 124 will receive (710) the indicator in a message from CC 122, e.g., when a channel is requested. When the media client receives a new manifest, e.g., in block 702, the media client will determine (712) whether the subscriber override is in effect, e.g., whether the value of the indicator is "True". If the subscriber override is not in effect, the method can move to either block 706 or block 722, depending on the options used. If the subscriber override is in effect, the media client sends (714) an override entitlement request to a content controller node or other network node performing this function. The media client will receive (716) override entitlements and will use (718) the override entitlements to enforce entitlements for the program.

Flowchart 700C provides for the use of channel entitlements, such that not every program manifest needs to contain a program entitlement block. As will be understood, portions of flowchart 700C logically precedes flowchart 700A. Media client receives (720) channel entitlements for the channel in which the program is broadcast. The channel entitlements can be received, e.g., during communications with CC 122 when the channel is requested. The media client then receives (722) a manifest containing new program information. The media client determines (724) whether the manifest file contains a program entitlement block. If the manifest file does contain a program entitlement block, the flow moves to either block 702 or block 732, depending on options. If the manifest file does not contain a program entitlement block, the media client uses (726) the entitlements specified in the channel entitlement block to enforce digital rights for the program.

Flowchart 700D provides for the use of device class entitlements, where multiple entitlement objects are provided in the program entitlement block, and can be entered from either block 702 or block 724. The media client determines whether the program entitlement block contains (732) multiple entitlement objects. If multiple entitlement objects are not present, the method moves to block 706. If multiple entitlement objects are present, the media client selects (734) a first entitlement object that has a device class that matches the user device. The media client then uses (736) entitlements that are specified in the selected entitlement object to enforce entitlements for the program.

Flowchart 700E is directed to the use of a hash code with the program entitlement block, which provides a method to streamline the process of implementing entitlements, by determining whether the program entitlement block has changed from the previous program. Where a hash code is implemented, the content of each program entitlement block is used to create a respective hash code, which is transmitted with the program entitlement block. As noted previously, all entitlements are encrypted when they are received by the media client to prevent user abuse of digital rights, so if it is determined that two hash codes are identical, there is no need to decrypt the entitlement block or to search for a matching device class. This flow chart is entered after block 724 after an entitlement block for a second program has been received. The media client determines (742) whether the hash code of the new program, which will be the next program to play, matches the hash code of the current program. If the hash codes do not match, the media client will move to one of blocks 706 or 732. If the hash codes do match, the media client uses (746) the entitlements specified in the current entitlement block to enforce entitlements for the new program.

Figure 8A:
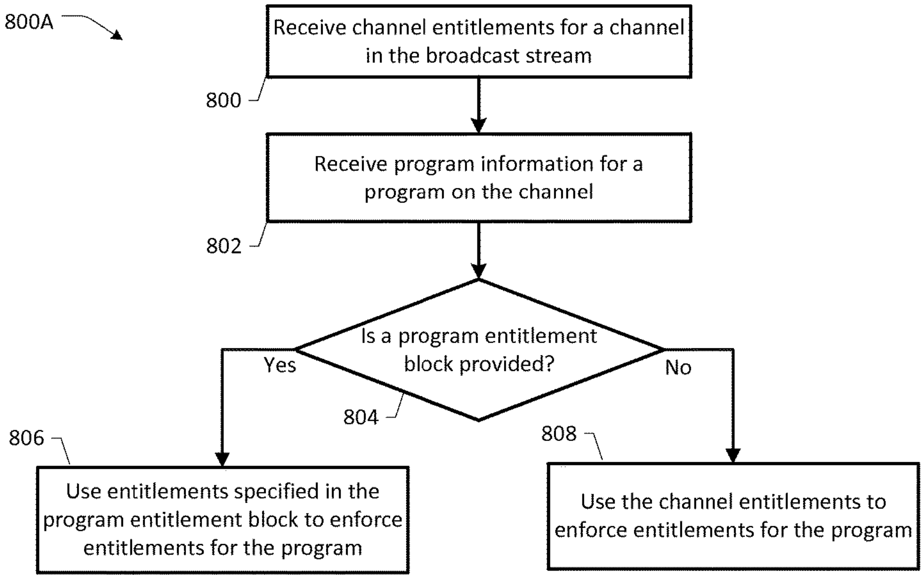
FIG. 8A depicts an illustrative method for enforcing entitlements at a media client according to an embodiment of the present patent application.

FIG. 8A depicts flowchart 800A, which is directed to a method operating on a user device for enforcing program entitlement in a broadcast stream. In this method, the media client receives (802) channel entitlements for a requested channel in the broadcast stream. The channel entitlements can be received, e.g., at the time the channel is requested from the content controller node. The media client also receives (812) program information for a program on the channel, e.g., in the manifest. When a new program starts or will soon start, the media client determines (804) whether a program entitlement block is provided for the new program. If a program entitlement block is provided, the media client uses (806) the entitlements specified in the program entitlement block to enforce entitlements for the program. If a program entitlement block is not provided, the media client uses (808) the channel entitlements to enforce entitlements for the program.

Figure 8B:
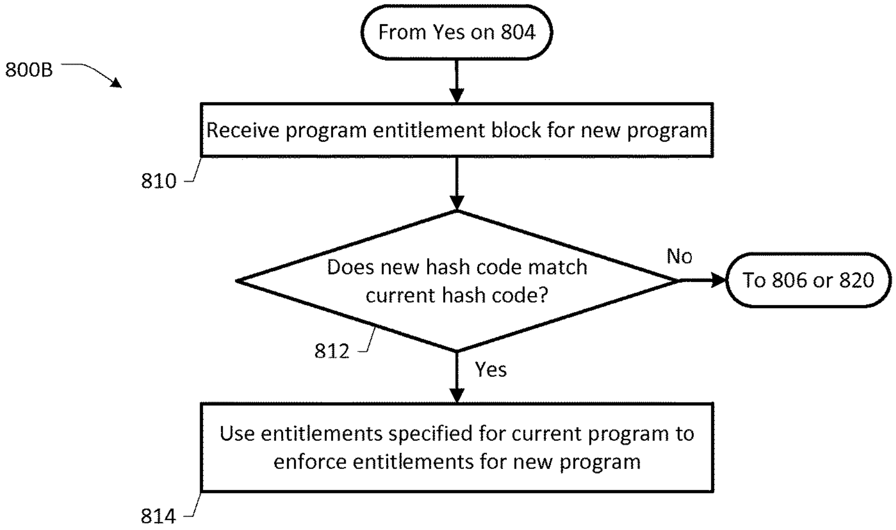
FIGS. 8B-8D depict additional aspects that can be practiced in combination with the method of FIG. 8A according to an embodiment of the present patent application.
Figure 8C:
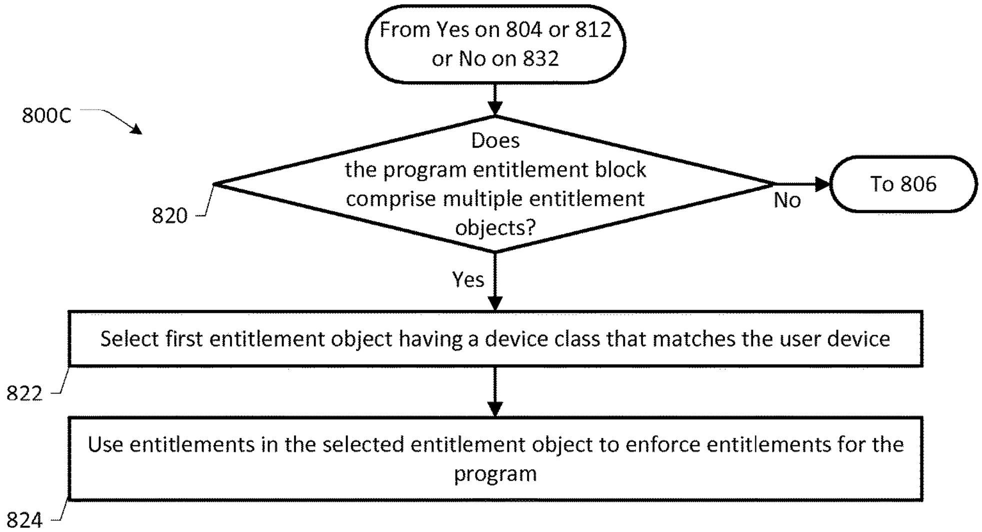
Figure 8D:
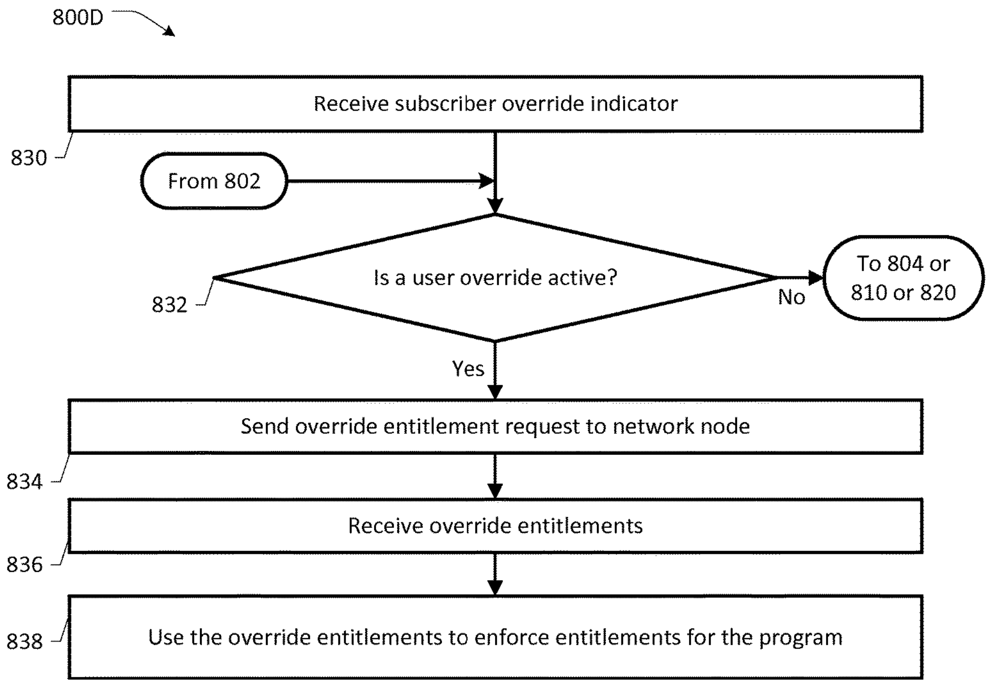

FIGS. 8B-8D depict flowcharts of additional aspects of the method that may be practiced in combination with the method of FIG. 8A. Flowchart 800B is directed to the use of a hash code with the program entitlement block. The flowchart can be entered when the answer to block 804 is "yes". The media client receives (810) a program entitlement block for a new program. The media client determines (812) whether the new hash code matches the current hash code. If the hash codes do not match, the media client can proceed to either block 806 or block 820, depending on the options used. If the hash codes match, so will the contents of the entitlement blocks. Therefore, the media client can use (814) the entitlements specified for the current program to enforce entitlements for the new program.

Flowchart 800C is directed to the use of device class entitlements such that multiple entitlement objects can be received in the entitlement block and is entered from a "yes" on blocks 804 or block 812 or from a "no" on block 832. The media client determines (820) whether the program entitlement block comprises a plurality of entitlement objects. If multiple entitlement objects are not present, the method proceeds to block 806. If multiple entitlement objects are present, the media client selects (822) a first entitlement object that has a device class that matches the user device and uses (824) the entitlements in the selected entitlement object to enforce entitlements for the program.

Flowchart 800D is directed to the use of a subscriber override indicator. When this option is used, the media client will receive (830) a subscriber override indicator from the network node, such as CC 122. In at least one embodiment, the subscriber override indicator is provided at the time the user requests a channel. Alternatively the subscriber override indicator can be provided in a beaconing mechanism. Remaining blocks of this flowchart are entered from block 802. The media client determines (832) whether the user override is active, e.g., whether the value of the indicator is "True". If the user override is not active, the method can proceed to any of block 804, block 810 or block 820, depending on the embodiment. If the user override is active, the media client sends (834) an override entitlement request to a content controller node and receives (836) override entitlements. The media client uses (838) the override entitlements to enforce entitlements for the program.

Figure 9:
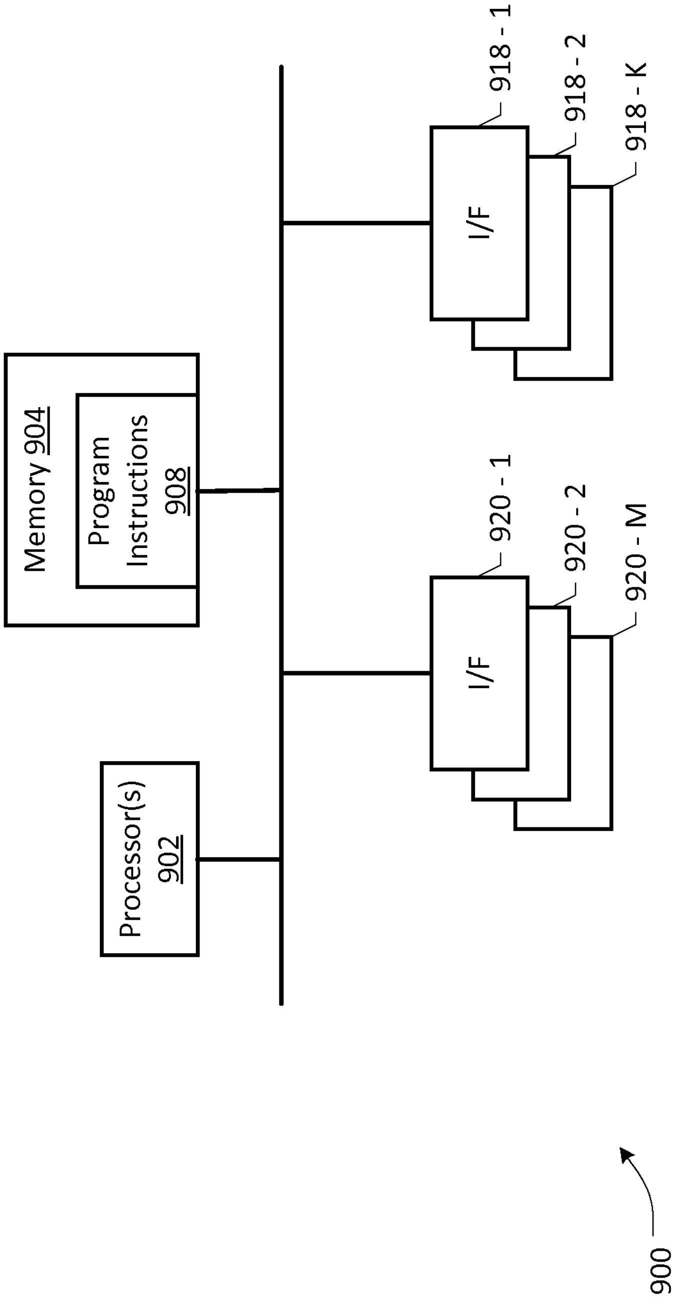
FIG. 9 depicts a block diagram of an example network node in the implementation of FIG. 1 according to an embodiment of the present patent application.

FIG. 9 depicts a block diagram of an example network node 900, e.g., CC 122, according to an embodiment of the present patent application. One or more processors 902 may be operatively coupled to various modules that may be implemented in persistent memory 904 for executing suitable program instructions 908 or code portions with respect to one or more processes set forth hereinabove for providing program and device class entitlements to client devices. Although only a single set of program instructions are shown, it will be understood that any number of processes can be instantiated in node 900. Appropriate interfaces (I/F) 920-1 to 920-M are operative to effectuate request/response messages to and from client devices, which can include managed devices, such as STBs, as well as unmanaged devices, such as mobile phones, tablets and laptops. Likewise, appropriate interfaces 1418-1 to 1418-K to various network elements and/or nodes (e.g., MM 112, ARG 120, and the like) may be provided in an example network node implementation.

Figure 10:
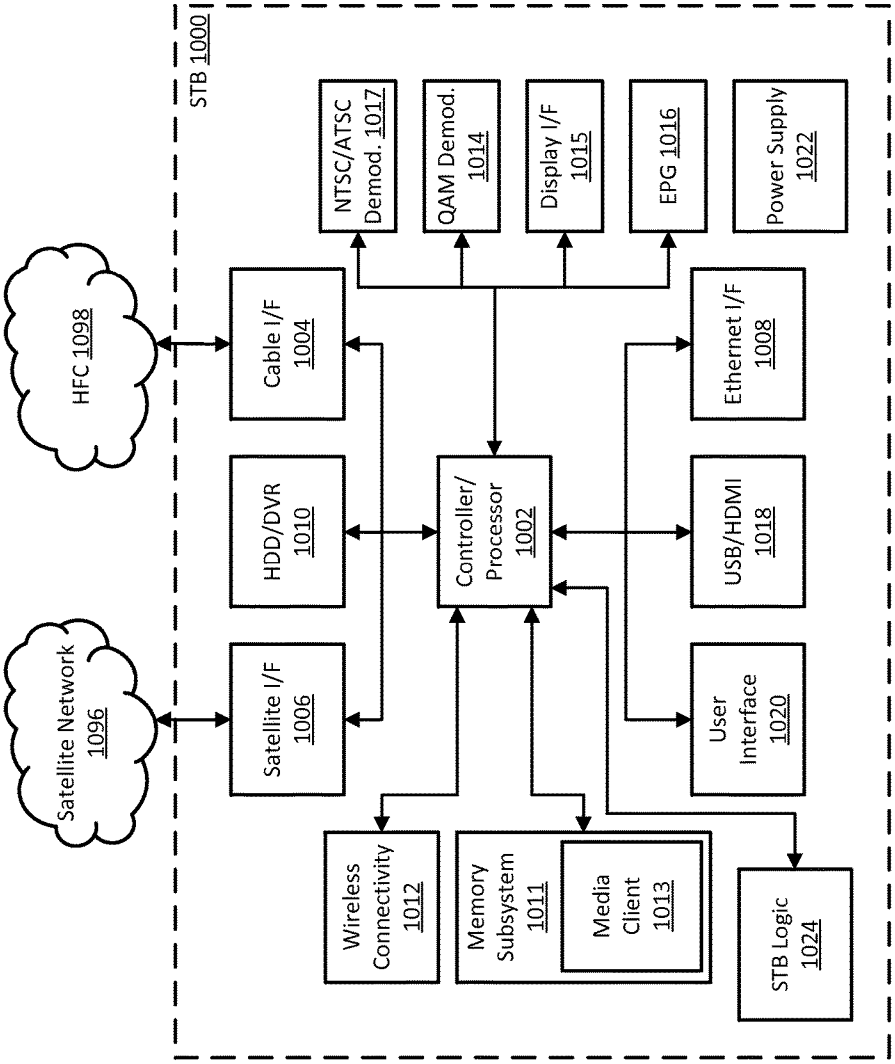
FIG. 10 depicts a block diagram of an example set top box according to an embodiment of the present patent application.

FIG. 10 depicts an overview of an STB 1000, which is an example of a managed client device. STB 1000 can include appropriate hardware/software components and subsystems configured for performing any of the device-side processes (either individually or in any combination thereof) with respect to receiving and enforcing program entitlements and device class entitlements as described herein. One or more microcontrollers/processors 1002 are provided for the overall control of the STB 1000 and for the execution of various stored program instructions embodied in a media client 1013 that may be part of a memory subsystem 1011. In another variation, a media client may be provided as a plug-in or an application within a browser, e.g., an HTML5 application executed within a browser. Controller/processor complex referred to by reference numeral 1002 may also be representative of other specialty processing modules such as graphic processors, video processors, digital signal processors (DSPs), and the like, operating in association with suitable video and audio interfaces (not specifically shown). Where applicable, appropriate interfaces such as cable TV I/F modules 1004 and/or satellite TV I/F modules 1006 involving tuners, demodulators, descramblers, MPEG/H.264/H.265 decoders/demuxes may be included for processing and interfacing with TV and other content signals received via an HFC cable network 1098 or a satellite network 1096. In a TV implementation, example demodulators may include QAM demodulator 1014 and NTSC/ATSC demodulator 1017. Other I/O or interfaces such as a display interface 1015, Electronic Program Guide (EPG) 1016, user interface 1020, USB/HDMI ports 1018, Ethernet I/F 1008, and short-range and wide area wireless connectivity interfaces 1012 are also provided. A hard disk drive (HDD) or DVR system 1010 is provided for mass storage of all sorts of program assets such as NV media, TV shows, movie titles, multimedia games, etc. Also included in the subscriber UE device 1000 is a suitable power supply block 1022, which may include AC/DC power conversion to provide power for the device 1000. It should be appreciated that the actual power architecture for the subscriber device 1000 may vary by the hardware platform used, e.g., depending upon the core SoC (System on Chip), memory, analog front-end, analog signal chain components and interfaces used in the specific platform, and the like. In an embodiment where program and device class entitlements are provided, STB Logic 624 may also be provided that allows for receipt and processing of these specific entitlements.

Figure 11:
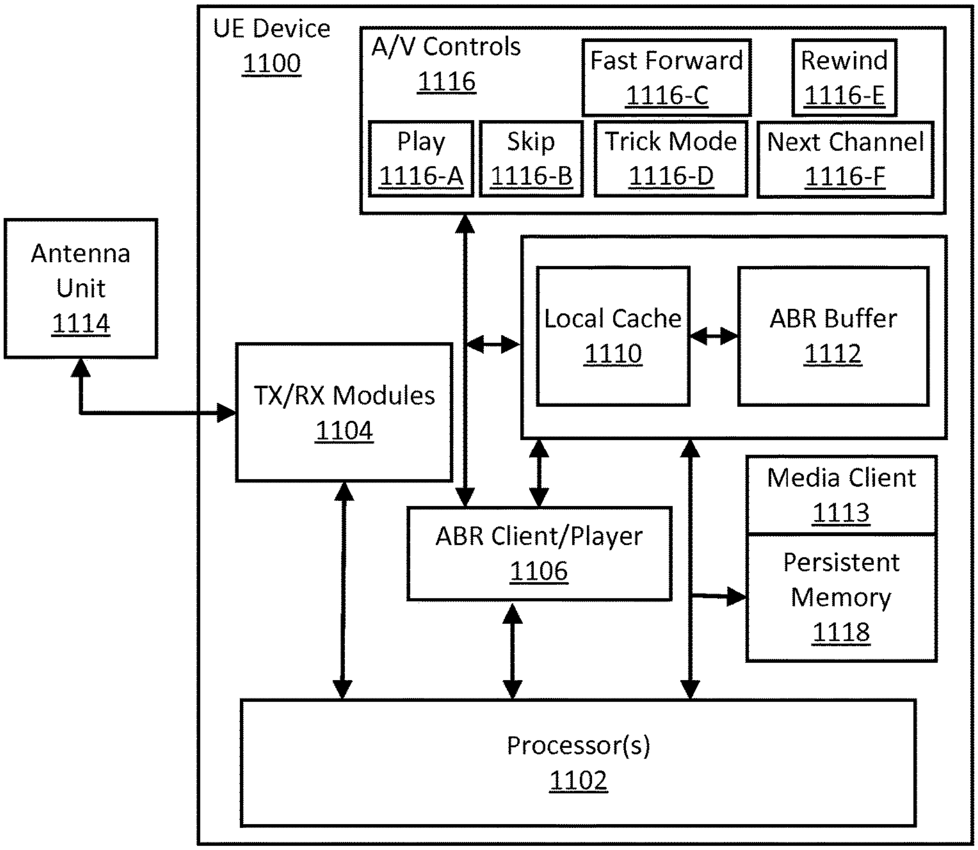
FIG. 11 depicts a block diagram of an example mobile device or wireless UE device according to an embodiment of the present patent application.

FIG. 11 depicts a block diagram of an example mobile device or wireless UE device 1100 including a media client 1113 configured to execute certain aspects under control of processor(s) 1102 according to one or more embodiments of the present patent application. Appropriate transceiver (Tx/

Rx) circuitry 1104 coupled to one or more antenna units 1114 is operative to effectuate radio communications for purposes of the present disclosure including, e.g., streaming of media and manifests and communication with a network node for channel and override entitlements, etc. in addition to other standard cellular telephony/data communications. The ABR client/player 1106 is operative to play out segments stored in an ABR buffer 1112 and a local cache 1110 is operative to store content.

As illustrated, the ABR client/player 1106 is provided with a plurality of ABR client controls 1116 that may be selectively operated by users for controlling user experience. Such ABR client controls may comprise audio controls as well as video controls available with respect to a streaming session and may include Play 1116-A, Skip 1116-B, Fast Forward 1116-C, Trick Mode or Trick Play 1116-D, Rewind 1116-E, and Next Channel or Channel Change 1116-E. A persistent memory module 1118 may be provided for storing appropriate program code or software instructions that may be executed by processors 1102 for effectuating outage message processing, display of notifications, ABR client control modulation, etc. in conjunction with other modules of the mobile device 1100.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added or inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method operable on a user device for enforcing program entitlements for a live streaming adaptive bitrate (ABR) channel, the method comprising:
- receiving channel entitlements from a network node;
- receiving, in the live streaming ABR channel from a content distribution network, an ABR manifest containing first program information for a first program in the live streaming ABR channel, the first program information providing a first program entitlement block that is applicable only to the first program;
- determining whether the first program entitlement block comprises a plurality of entitlement objects that each comprises a set of entitlements and targets a respective device class to which the set of entitlements is applied;
- responsive to determining that the first program entitlement block comprises the plurality of entitlement objects, a media client that operates under control of a processor on the user device parsing respective device classes within the first program entitlement block until a first device class matching the user device is found, selecting a respective entitlement object of the plurality of entitlement objects and using entitlements specified in the selected entitlement object to enforce entitlements for the first program; and
- responsive to the media client determining that the first program entitlement block does not comprise a plurality of entitlement objects, using entitlements specified in the first program entitlement block to enforce entitlements for the first program.

2. The method as recited in claim 1 further comprising:
- receiving a subscriber override indicator;
- determining whether a subscriber override is in effect for the user device;
- responsive to determining that the subscriber override is in effect, sending an override entitlement request to a network node; and
- responsive to receiving override entitlements, using the override entitlements to enforce entitlements for the first program.

3. The method as recited in claim 1 further comprising:
- receiving, in the ABR manifest from the content distribution network, second program information for a second program in the live streaming ABR channel;
- determining whether the second program information provides a second program entitlement block that is applicable only to the second program; and
- responsive to determining that the second program entitlement block is not provided, using the channel entitlements to enforce entitlements for the second program.

4. The method as recited in claim 1 wherein the ABR manifest received from the content distribution network includes at least one entitlement selected from the group comprising activation time, device type, playback enabled/disabled on jailbroken devices, network connection type, HDMI/airplay enabled/disabled, in/out home, in/out country, stream count limits, minimum bitrate, maximum bitrate, fast-forward enabled/disabled, rewind enabled/disabled, maximum bitrate on a jailbroken device, minimum/maximum play position, maximum number of ads to play, session shift enabled/disabled.

5. The method as recited in claim 3 further comprising:
- determining whether a hash code associated with the second program entitlement block matches a hash code associated with the first program entitlement block; and
- responsive to determining that the hash codes match, using entitlements specified in the first entitlement block to enforce entitlements for the second program.

6. A method operable on a user device for enforcing program entitlements for a live streaming adaptive bitrate (ABR) stream, the method comprising:
- receiving channel entitlements for a channel in the live streaming ABR stream;
- receiving, in the live streaming ABR stream, an ABR manifest from a content distribution network, the ABR manifest containing program information for a first program on the channel;
- a media client that operates under control of a processor on the user device determining whether a first program entitlement block that is applicable only to the first program is provided in the program information;
- if the first program entitlement block is provided,
  - the media client determining whether the first program entitlement block comprises a plurality of entitlement objects that each comprises a set of entitlements and targets a respective device class to which the set of entitlements is applied; and
  - responsive to determining that the first program entitlement block comprises a plurality of entitlement objects, the media client parsing respective device classes within the first program entitlement block until a first device class matching the user device is found, selecting a respective entitlement object of the plurality of entitlement objects and using entitlements specified in the selected entitlement object to enforce entitlements for the first program;
  - responsive to determining that the first program entitlement block does not comprise a plurality of entitlement objects, the media client using entitlements specified in the first program entitlement block to enforce entitlements for the first program; and
- if the first program entitlement block is not provided, using the channel entitlements to enforce entitlements for the first program.

7. The method as recited in claim 6 further comprising:
- receiving a subscriber override indicator;
- prior to determining whether the first program entitlement block is provided, determining whether a user override is active; and
- responsive to determining that the user override is active, sending an override entitlement request to a network node;
- receiving override entitlements for the first program; and
- using the override entitlements to enforce entitlements for the first program.

8. The method as recited in claim 6 wherein the channel entitlements are received from a network node.

9. The method as recited in claim 8 further comprising:
- receiving, in the ABR manifest from the content distribution network, a second program entitlement block for a second program determining whether a hash code associated with the second program entitlement block matches a hash code associated with the first program entitlement block; and responsive to determining that the hash codes match, using entitlements in the first program entitlement block to enforce entitlements for the second program.

10. An apparatus for enforcing program entitlements for a live streaming adaptive bitrate (ABR) channel comprising:

one or more processors operably coupled to a memory having a sequence of program instructions which, when executed by the one or more processors, perform the following:

receiving channel entitlements from a network node;

receiving, in the live streaming ABR channel from a content distribution network, an ABR manifest containing first program information for a first program in the live streaming ABR channel, the first program information providing a first program entitlement block that is applicable only to the first program;

determining whether the first program entitlement block comprises a plurality of entitlement objects, at least one entitlement object having a respective device class with which the entitlement object is associated;

responsive to determining that the first program entitlement block comprises a plurality of entitlement objects that each comprises a set of entitlements and targets a respective device class to which the entitlements belong, parsing respective device classes within the first program entitlement block until a first device class matching the user device is found, selecting a respective entitlement object of the plurality of entitlement objects and using the entitlements specified in the selected entitlement object to enforce entitlements for the first program; and responsive to determining that the first program entitlement block does not comprise a plurality of entitlement objects, using entitlements specified in the first program entitlement block to enforce entitlements for the first program.

11. The apparatus as recited in claim 10 wherein the sequence of program instructions further performs the following:

receiving a subscriber override indicator;

determining whether a subscriber override is in effect for the user device;

responsive to determining that the subscriber override is in effect, sending an override entitlement request to a network node; and responsive to receiving override entitlements, using the override entitlements to enforce entitlements for the first program.

12. The apparatus as recited in claim 10 wherein the sequence of program instructions further performs the following:

receiving, in the ABR manifest from the content distribution network, second program information for a second program in the live streaming ABR channel;

determining whether the second program information provides a second program entitlement block that is applicable only to the second program; and responsive to determining that the second program entitlement block is not provided, using the channel entitlements to enforce entitlements for the second program.

13. The apparatus as recited in claim 12 wherein the sequence of program instructions further performs the following:

determining whether a hash code associated with the second program entitlement block matches a hash code associated with the first program entitlement block; and responsive to determining that the hash codes match, using entitlements specified in the first entitlement block to enforce entitlements for the second program.

* * * * *